US012701086B2

(12) United States Patent
Avnery et al.

(10) Patent No.: US 12,701,086 B2
(45) Date of Patent: Aug. 4, 2026

(54) ESTABLISHING CONNECTIONS IN A COMPUTER NETWORK

(71) Applicant: Mellanox Technologies, Ltd., Yokneam (IL)

(72) Inventors: Yuval Avnery, Hahotrim (IL); Charlie Mubariki, Kiryat Shmona (IL)

(73) Assignee: Mellanox Technologies Ltd., Yokneam (IL)

( * ) Notice: Subject to any disclaimer, the term of this patent is extended or adjusted under 35 U.S.C. 154(b) by 300 days.

(21) Appl. No.: 18/374,538

(22) Filed: Sep. 28, 2023

(65) Prior Publication Data

US 2025/0112872 A1     Apr. 3, 2025

(51) Int. Cl.
| | |
|---|---|
| H04L 47/62 | (2022.01) |
| H04L 47/625 | (2022.01) |
| H04L 49/253 | (2022.01) |

(52) U.S. Cl.
CPC ...... H04L 47/6225 (2013.01); H04L 47/6255 (2013.01); H04L 49/254 (2013.01)

(58) Field of Classification Search
CPC ............. H04L 47/6225; H04L 47/6255; H04L 49/254
See application file for complete search history.

(56) References Cited

U.S. PATENT DOCUMENTS

| | | | | | |
|---|---|---|---|---|---|
| 7,620,693 | B1 * | 11/2009 | Mott | ..................... | H04L 49/901 710/22 |
| 10,999,364 | B1 * | 5/2021 | Itigin | ................... | H04L 69/326 |

| | | | | | |
|---|---|---|---|---|---|
| 2002/0152328 | A1 * | 10/2002 | Kagan | ..................... | H04L 49/90 709/250 |
| 2016/0248628 | A1 * | 8/2016 | Pandit | ................. | H04L 41/0806 |
| 2016/0342567 | A1 * | 11/2016 | Tsirkin | .................. | H04L 49/901 |
| 2017/0168986 | A1 * | 6/2017 | Sajeepa | ............. | G06F 15/17331 |
| 2017/0302526 | A1 * | 10/2017 | Chen | ........................ | H04L 67/14 |
| 2018/0011763 | A1 * | 1/2018 | Tanaka | ................ | G06F 11/1076 |
| 2018/0152278 | A1 * | 5/2018 | Chen | ..................... | H04L 67/141 |
| 2018/0267919 | A1 * | 9/2018 | Burstein | ............ | G06F 13/4027 |
| 2019/0317909 | A1 * | 10/2019 | Gupta | ................. | G06F 13/1668 |
| 2021/0004165 | A1 * | 1/2021 | Benisty | ................ | G06F 3/0661 |
| 2021/0157691 | A1 * | 5/2021 | LePera | ................ | H04L 12/4625 |
| 2021/0397379 | A1 * | 12/2021 | Leconte | ............... | G06F 3/0604 |
| 2022/0060418 | A1 * | 2/2022 | Le | ........................... | H04L 45/38 |
| 2022/0391333 | A1 * | 12/2022 | Veluswamy | .......... | G06F 9/5016 |
| 2023/0214157 | A1 * | 7/2023 | Soi | ........................ | G06F 3/0659 711/154 |
| 2024/0305637 | A1 * | 9/2024 | Horowitz | ............ | H04L 63/0428 |
| 2024/0393954 | A1 * | 11/2024 | Dhatchinamoorthy | ...................... G06F 3/0659 |
| 2024/0427499 | A1 * | 12/2024 | Yokokura | ............. | G06F 3/0619 |

OTHER PUBLICATIONS

InfiniBAnd™ Architecture Specification vol. 1; Release 1.2.1 Nov. 2007.

* cited by examiner

*Primary Examiner* — Melanie Jagannathan
(74) *Attorney, Agent, or Firm* — PEARL COHEN LLP

(57) ABSTRACT

A system and method for establishing connections in a computer network supporting a remote direct memory access (RDMA) protocol, may include: generating a plurality of dummy queue pairs, each generated with dummy parameter values; and upon receiving a request to establish a connection from a first computer node in the computer network, turning one of the dummy queue pairs into a functional queue pair by changing a subgroup of the dummy parameter values to true parameter values.

18 Claims, 9 Drawing Sheets

300

CLIENT
120

RDMA NIC
122

CM
124

QP1
126

QP
128

CLIENT
220

RDMA NIC
222

CM
224

QP1
226

QPX
228

SERVER
130

RDMA NIC
132

CM
134

QP1
136

QP
232

QP
234

DQP
231

DQP
233

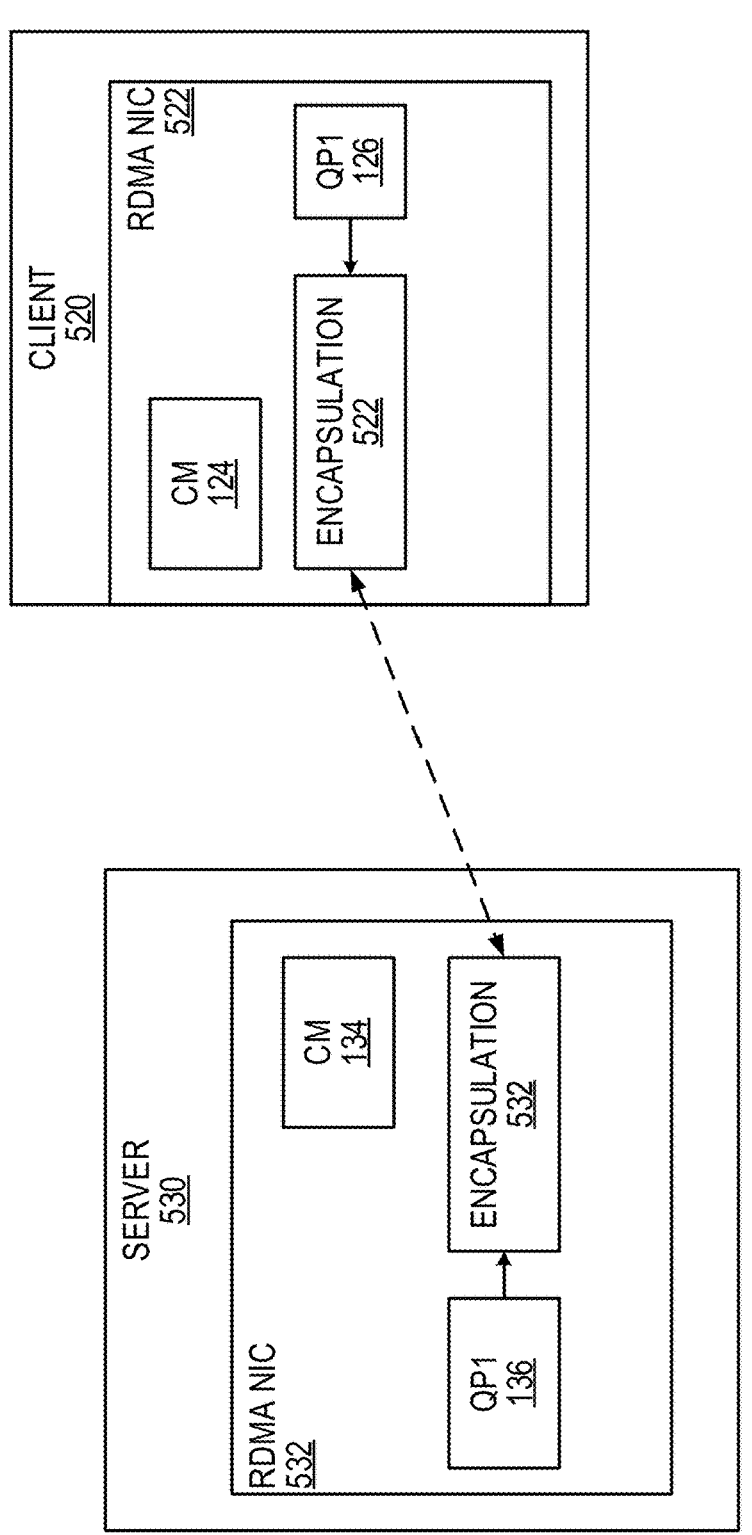
Fig. 5

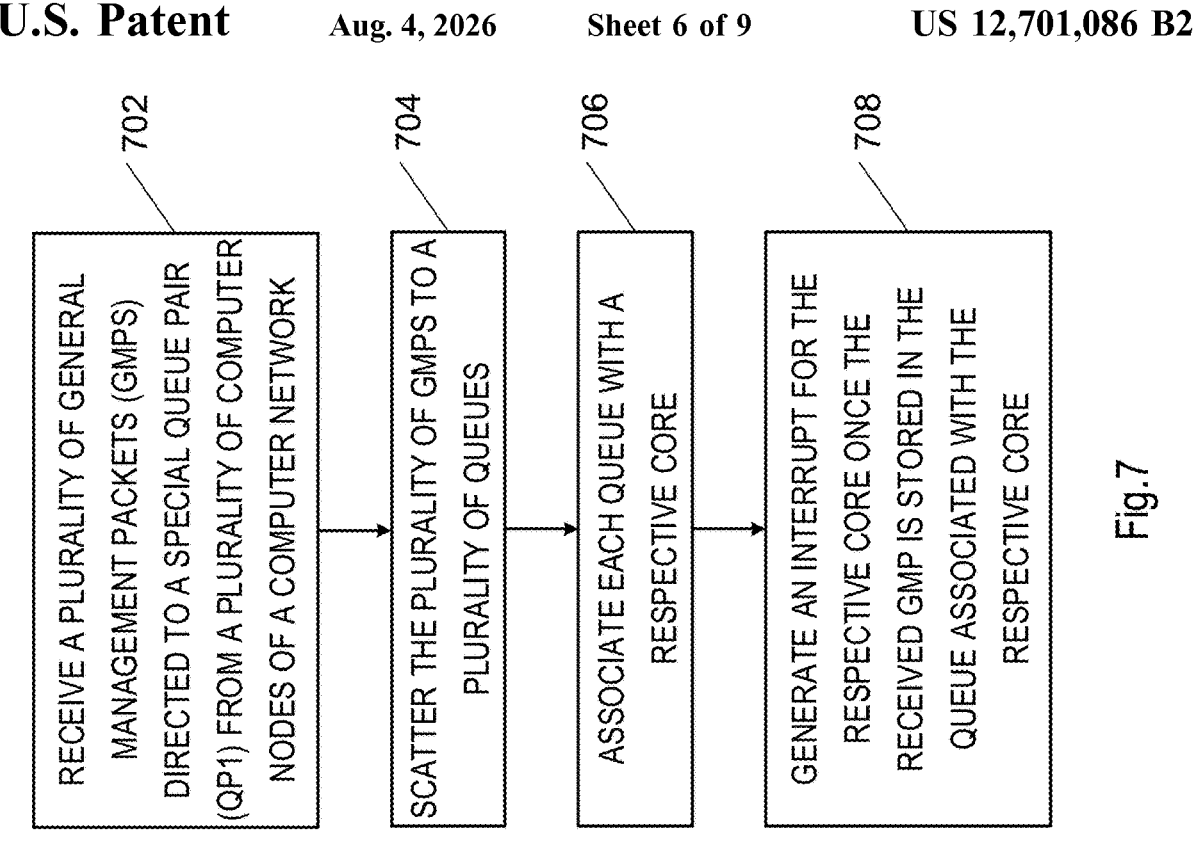

702 — RECEIVE A PLURALITY OF GENERAL MANAGEMENT PACKETS (GMPS) DIRECTED TO A SPECIAL QUEUE PAIR (QP1) FROM A PLURALITY OF COMPUTER NODES OF A COMPUTER NETWORK

704 — SCATTER THE PLURALITY OF GMPS TO A PLURALITY OF QUEUES

706 — ASSOCIATE EACH QUEUE WITH A RESPECTIVE CORE

708 — GENERATE AN INTERRUPT FOR THE RESPECTIVE CORE ONCE THE RECEIVED GMP IS STORED IN THE QUEUE ASSOCIATED WITH THE RESPECTIVE CORE

Fig.7

610 — GENERATE A PLURALITY OF DUMMY QUEUE PAIRS WITH DUMMY PARAMETER VALUES

620 — RECEIVE A REQUEST TO ESTABLISH A CONNECTION

630 — TURN ONE OF THE DUMMY QUEUE PAIRS INTO A FUNCTIONAL QUEUE PAIR BY CHANGING A SUBGROUP OF THE DUMMY PARAMETER VALUES TO TRUE PARAMETER VALUES

Fig. 6

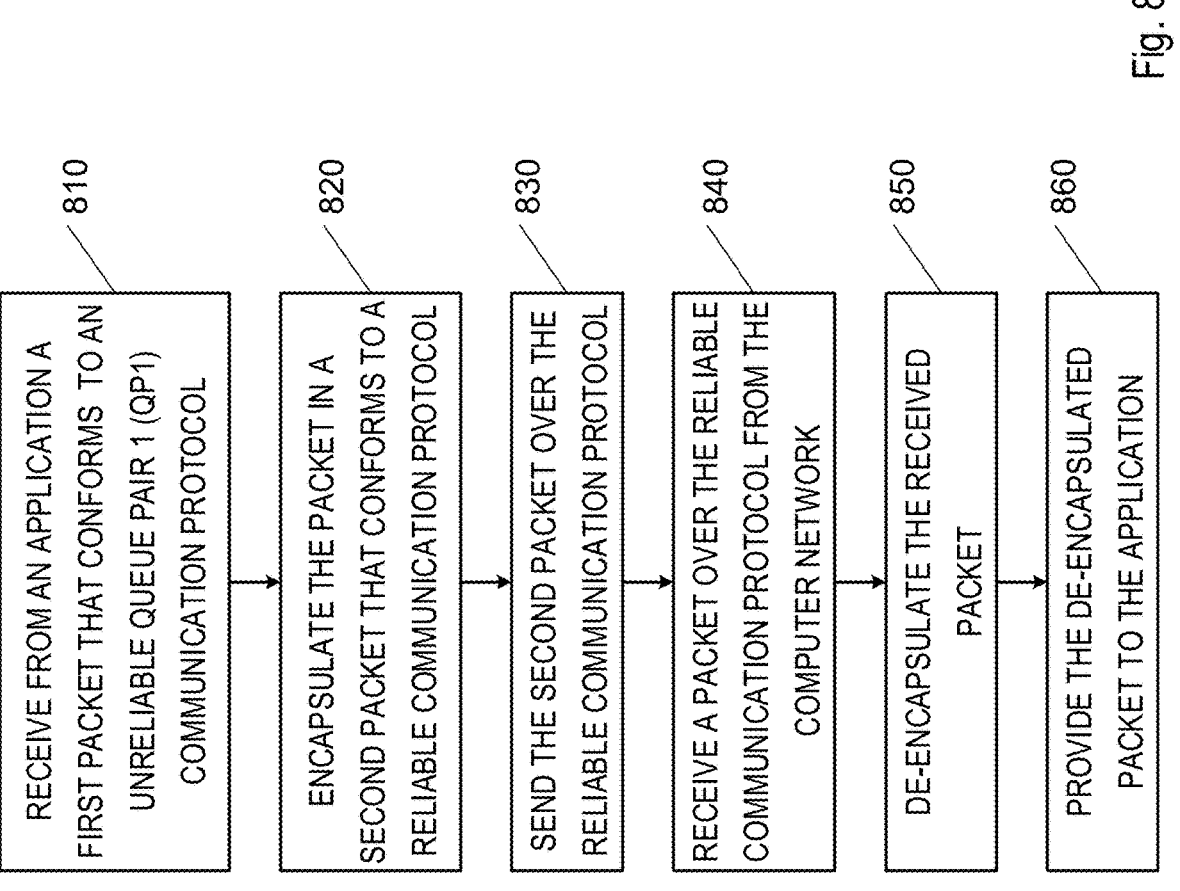

810 RECEIVE FROM AN APPLICATION A FIRST PACKET THAT CONFORMS TO AN UNRELIABLE QUEUE PAIR 1 (QP1) COMMUNICATION PROTOCOL

820 ENCAPSULATE THE PACKET IN A SECOND PACKET THAT CONFORMS TO A RELIABLE COMMUNICATION PROTOCOL

830 SEND THE SECOND PACKET OVER THE RELIABLE COMMUNICATION PROTOCOL

840 RECEIVE A PACKET OVER THE RELIABLE COMMUNICATION PROTOCOL FROM THE COMPUTER NETWORK

850 DE-ENCAPSULATE THE RECEIVED PACKET

860 PROVIDE THE DE-ENCAPSULATED PACKET TO THE APPLICATION

Fig. 8

ESTABLISHING CONNECTIONS IN A COMPUTER NETWORK

FIELD

The present invention relates generally to establishing connections in a computer network supporting a remote direct memory access (RDMA) protocol.

BACKGROUND

Remote direct memory access (RDMA) is a protocol that allows for direct memory access between two remote computers, or between the memory of the two computers, without innervation of the CPU and the operating system in both computers, making it suitable for high-performance and low-latency networking applications. RDMA may be implemented over InfiniBand (IB) communication protocol, Ethernet (using Converged Ethernet (RoCE) protocol) and the Internet (using Internet Wide Area RDMA Protocol, iWARP), as well as other communication standards.

In the RDMA framework, work queues may refer to hardware and/or software infrastructures that enable to queue up a set of instructions that the hardware executes. Work queues are created in pairs, called a Queue Pair (QP), one for send operations and one for receive operations. In general, the send work queue holds instructions that cause data to be transferred between the memory of one computer and the memory of a second computer, and the receive work queue holds instructions about where to place data that is received from the other computer. To establish a connection, both sides should create QPs with matching attributes.

SUMMARY

According to embodiments of the invention, a system and method for establishing connections in a computer network supporting a RDMA, may include: generating a plurality of dummy queue pairs, where each may be generated with dummy parameter values; and upon receiving a request to establish a connection from a first computer node in the computer network, turning one of the dummy queue pairs into a functional queue pair by changing a subgroup of the dummy parameter values to true parameter values.

According to some embodiments, generating each of the plurality of dummy queue pairs may include using the dummy parameter values to perform state transitions of the dummy queue pair up to a ready to send state of the dummy queue pair.

According to some embodiments, each of the dummy queue pairs may be associated with one computer node of a plurality of computer nodes in the computer network, and turning one of the dummy queue pairs into a functional queue pair may include turning the dummy queue pair associated with the first computer node into the functional queue pair.

According to some embodiments, the subgroup of the dummy parameters may include at least one of: a real address vector, a destination queue pair, a packet sequence number (PSN), and maximum number of outstanding read requests.

According to some embodiments, the dummy parameter values may be changed to the true parameter values using a ready to send to ready to send (RTS2RTS) command modified to change the subgroup of the dummy parameter values to the true parameter values.

According to some embodiments, the true parameter values may be provided from the client to the server in the request.

According to some embodiments, the dummy parameter values may be changed to the true parameter values using dedicated hardware.

Embodiments of the invention may further include: receiving a plurality of requests to establish a connection from other computer nodes; and scattering the plurality of requests to establish a connection to a plurality of queues.

Embodiments of the invention may further include: sending an accept message to the first computer node after turning the dummy queue pair into a functional queue pair.

According to some embodiments, receiving the request command and sending the accept message may be performed by an unreliable communication protocol, and embodiments of the invention may further include encapsulating the messages into packets of a reliable communication protocol.

According to embodiments of the invention, a system and method for scattering general management packets (GMPs) in a computer network supporting an RDMA protocol may include: receiving a plurality of GMPs directed to a special queue pair (QP1) from a plurality of computer nodes of the computer network; and scattering the plurality of GMPs to a plurality of queues.

According to some embodiments, the scattering the plurality of GMPs to the plurality of queues may be performed by, for each received GMP: hashing the source address of the received GMP; selecting a queue for the received GMP from the plurality of queues based on the hash result; and storing the received GMP in the selected queue.

Embodiments of the invention may further include: associating each queue with a respective core; and generating an interrupt for the respective core once the received GMP is stored in the queue associated with the respective core.

Embodiments of the invention may further include: generating a plurality of dummy queue pairs, each generated with dummy parameter values; and upon receiving a request to establish a connection from a first computer node in the computer network, in one of the plurality of GMPs, turning one of the dummy queue pairs into a functional queue pair by changing a subgroup of the dummy parameter values to true parameter values.

According to some embodiments, generating each of the plurality of dummy queue pairs may include using the dummy parameter values to perform state transitions of the dummy queue pair up to a ready to send state of the dummy queue pair.

According to some embodiments, each of the dummy queue pairs may be associated with one computer node of a plurality of computer nodes in the computer network, and turning one of the dummy queue pairs into a functional queue pair may include turning the dummy queue pair associated with first computer node into the functional queue pair.

According to some embodiments, the subgroup of the dummy parameters may include at least one of: a real address vector, a destination queue pair, a packet sequence number (PSN), and maximum number of outstanding read requests.

According to some embodiments, the dummy parameter values may be changed to the true parameter values using a ready to send to ready to send (RTS2RTS) command modified to change the subgroup of the dummy parameter values to the true parameter values.

According to some embodiments, the true parameter values may be provided from the client to the server in the request.

According to some embodiments, the dummy parameter values may be changed to the true parameter values using dedicated hardware.

According to embodiments of the invention, a system and method for establishing connections in a computer network supporting an RDMA protocol may include: receiving from an application a first packet, wherein the first packet conforms to an unreliable queue pair 1 (QP1) communication protocol; encapsulating the packet in a second packet, wherein the second packet conforms to a reliable communication protocol; and sending the second packet over the reliable communication protocol.

According to embodiments of the invention, a system and method for establishing connections in a computer network supporting an RDMA protocol may include: receiving a packet over the reliable communication protocol from the computer network, where the packet is intended for QP1, decapsulating the received packet and providing the decapsulated packet to the application (e.g., to QP1 or RDMA CM).

According to some embodiments, the packet may include any one of request, accept and establish messages of the RDMA protocol.

According to some embodiments, the reliable communication protocol may be a DC protocol.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. Embodiments of the invention, however, both as to organization and method of operation, together with objects, features and advantages thereof, can be understood by reference to the following detailed description when read with the accompanying drawings. Embodiments of the invention are illustrated by way of example and not limitation in the figures of the accompanying drawings, in which like reference numerals indicate corresponding, analogous or similar elements, and in which:

FIG. 5 is a high-level schematic diagram of a computer network that implements RDMA protocol with reliable communication datagram for general management packets, according to embodiments of the invention.

FIG. 6 is a flowchart of a method for establishing connections in a computer network supporting an RDMA protocol, according to embodiments of the invention.

FIG. 7 is a flowchart of a method for scattering general management packets in a computer network supporting an RDMA protocol, according to embodiments of the invention.

FIG. 8 is a flowchart of a method for encapsulating general management packets in a computer network supporting an RDMA protocol, according to embodiments of the invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of embodiments of the invention. However, it will be understood by those skilled in the art that the present invention can be practiced without these specific details. In other instances, well-known methods, procedures, and components, modules, units and/or circuits have not been described in detail so as not to obscure embodiments of the invention.

Figure 1:
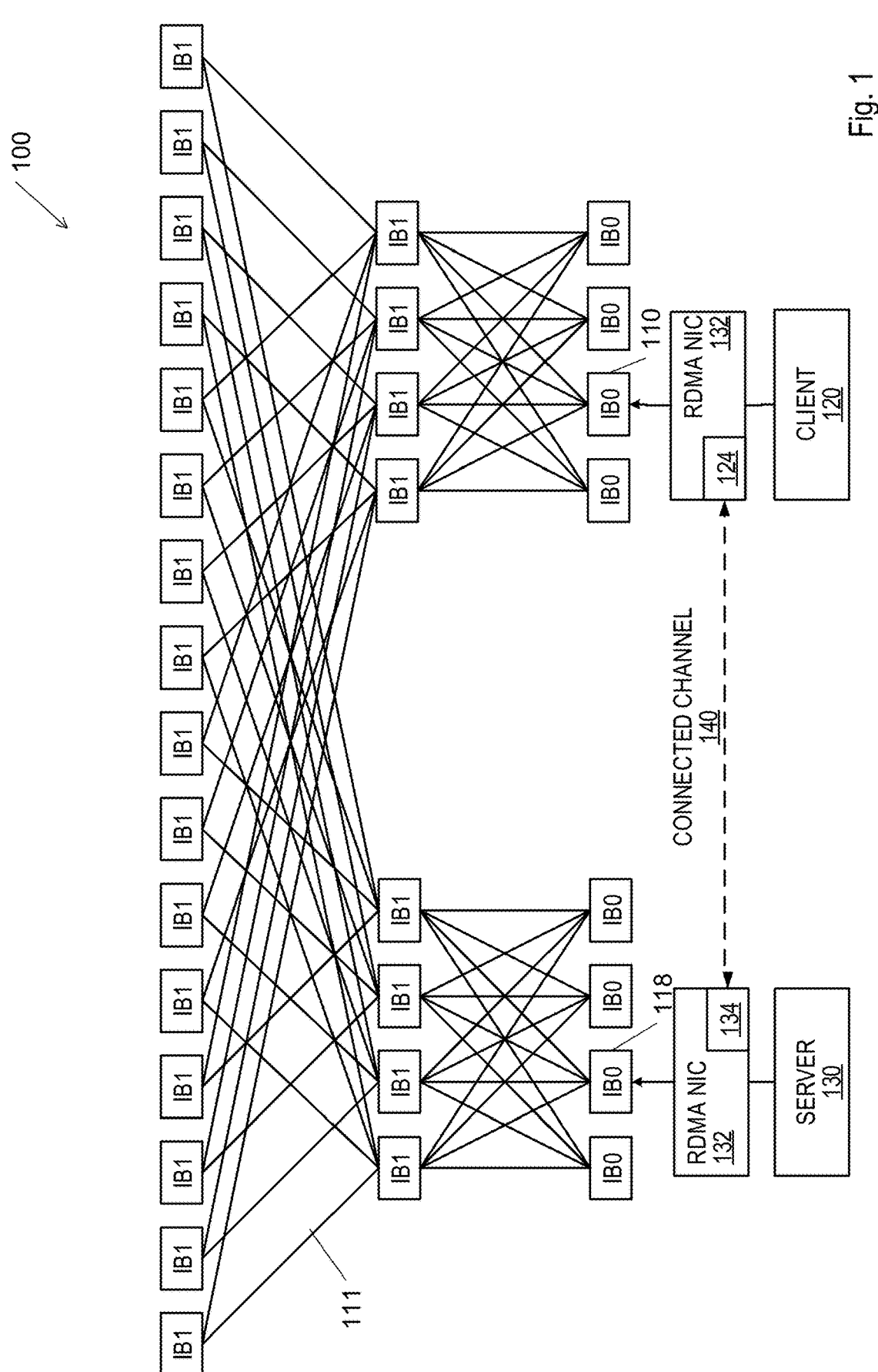
FIG. 1 depicts a high-level schematic diagram of a computer network that implements remote direct memory access (RDMA) protocol, according to embodiments of the present invention.

Reference is made to FIG. 1, which is a high-level schematic diagram of a computer network that implements remote direct memory access (RDMA) protocol, according to embodiments of the invention. It should be readily understood that the components and functions shown in FIG. 1 are intended to be illustrative only and embodiments of the invention are not limited thereto.

Network 100 may include any type of computer network or combination of networks that implements the RDMA protocol. Network 100 may support communication among computing devices, referred to as nodes, such as client 120 and host 130 (also referred to herein as server 130) via one or more switches IB0 and IB1. In some embodiments switches IB0 and IB1 may form a hierarchy, in which switches IB0 may form the lowest level in the hierarchy and may be connected to a node (e.g., client 120 and host 130 or other types of nodes), while switches IB1 may form higher levels in the hierarchy and may be connected to other switches and/or routers (some or all of switches IB1s may also be routers). Some or all of switches IB0 and IB1 may be or may include a computing device such as computing device 700 depicted in FIG. 10. Switches IB0 and IB1 may be interconnected to each other by links or edges 111 (the terms links and edges may be used herein interchangeably to refer to physical layer connections between two adjacent network components) in any suitable topology.

Network 100 may be implemented, for example, in data centers, high-performance compute clusters and embedded applications that may scale from two nodes up to clusters utilizing thousands of nodes or more. Thus, it is noted that while only one client 120 and one host 130 are shown in FIG. 1, this is not limiting and network 100 may be used for interconnecting a plurality of clients 120 to a plurality of hosts 130, and other computing recourses such as storage, embedded systems, etc. Client 120 may be connected to switch 110 via an RDMA network interface controller (RDMA NIC) 122, also referred as a host channel adapter and host 130 may be connected to switch 118 via an RDMA NIC 132. Links 111 may include, for example, a wired, fiber optic, or any other type of connection. Each of client 120, RDMA NIC 122, host 130 and RDMA NIC 132 may include a computing device a such as computing device 700 depicted in FIG. 10. RDMA NICs 122 and 132 may be RDMA-capable network adapters, that may be physically internal or external to client 120 and host 130, respectively.

According to some embodiments, network 100 may operate and implement RDMA in accordance with InfiniBand (IB) specifications. Relevant features of the IB architecture are described in the InfiniBand™ Architecture Specification Volume 1 Release 1.6, published Jul. 15, 2022, or other releases, distributed by the InfiniBand Trade Association. Alternatively, network 100 may operate in accordance with other computer communication standards such as Ethernet protocol, e.g., as defined by the IEEE 802.1ah standard, and other communication schemes.

Each of RDMA NIC 122, and RDMA NIC 132, or the RDMA communication manager 124 and 134 (RDMA CM, e.g., the software, hardware, or combination of the two that supports the communication management mechanisms and protocols), within each of RDMA NIC 122, and RDMA NIC 132, respectively, may include a special QP intended for initial communication and general management packets (GMPs) that is referred to as QP1. In one embodiment QP1 may have special features that make it unique compared to other QPs: QP1 may be permanently configured for unreliable datagram class of service, and each port of RDMA CM 124, and RDMA CM 134 has a QP1 that sends and receives packets.

According to embodiments of the invention, client 120 and host 130 may establish a connection 140 between them, e.g., in the transport layer of network 100, according to the RDMA protocol. An RDMA connection (referred to herein as a virtual connection or simply as a connection) may be established if both the client 120 and host 130 have RDMA-capable network adapters, e.g., RDMA NICs 122 and 132, that support a compatible RDMA protocol such as Infini-Band or RoCE (RDMA over Converged Ethernet) or other compatible RDMA protocol. After establishing connection 140, communication between client 120 and host 130 may take place between a source QP, e.g., in RDMA NIC 122 of client 120, and a destination QP, e.g., in RDMA NIC 132 in host 130. RDMA NIC 122 and RDMA NIC 132 may create this virtual connection 140 by each allocating a QP and specifying its class of service. For connection-oriented service, a specific QP in RDMA NIC 122 should be bound to a specific QP in RDMA NIC 132. To establish a connection 140, RDMA NIC 122 and RDMA NIC 132 may initiate any communication establishment aimed at binding a QP in RDMA NIC 122 with a QP in RDMA NIC 132, respectively, and may configure the QP context with certain information such as destination LID, service level, and negotiated operating limits.

Figure 2:
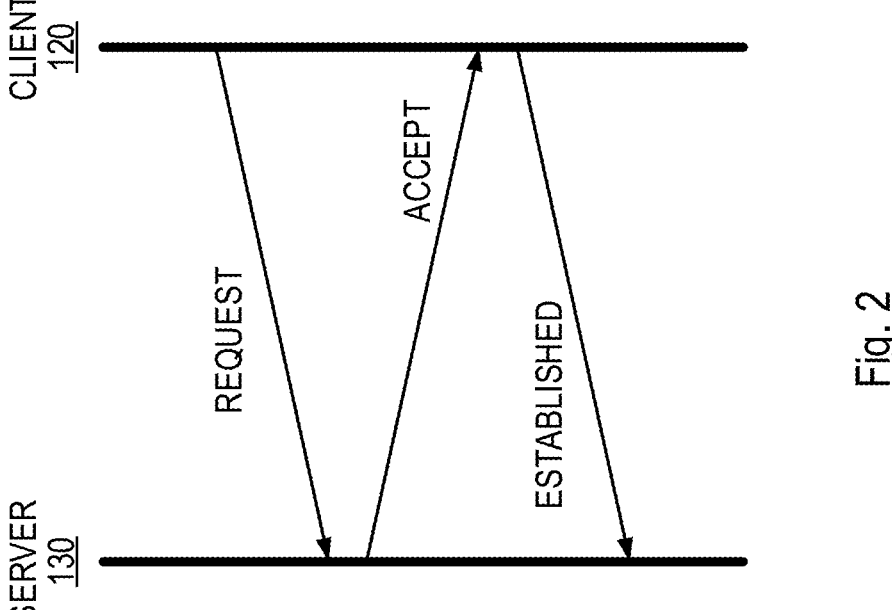
FIG. 2 depicts a communication sequence for establishing an RDMA connection, according to embodiments of the present invention.

A communication sequence, according to some embodiments, for establishing an RDMA connection 140 is depicted in FIG. 2. To establish connection 140, RDMA CM 124, and RDMA CM 134, may communicate over QP1 of RDMA NIC 122 and RDMA NIC 132. In one implementation, RDMA CM 124 of client 120 may send a REQUEST message to RDMA CM 134 of host 130. RDMA CM 124 may place certain parameters, such as the ServiceID that designates the desired service, in the REQUEST message that begins the connection establishment sequence. The ServiceID may allow RDMA CM 134 to associate the request with the appropriate server entity. Should the request be accepted, RDMA CM 134 may return a queue pair number (QPN) in a response (ACCEPT) message. Once the ACCEPT message is obtained at RDMA CM 124, RDMA CM 124 may issue an established (ESTABLISHED) message, and the connection is established. The REQUEST, ACCEPT and ESTABLISHED messages may all be GMPs.

Typically, after obtaining the request message on its QP1 channel, RDMA CM 134 may perform a series of operations and transitions between states to allocate a QP for connection 140, e.g., the states may include CreateQP, RTSINIT and INIT2RTR, where in the last state, e.g., INIT2RTR, the connection is operational and may transmit and receive. These operations may take time. While this time may not be significant for establishment of a single connection 140, it may present series challenges as the number of nodes, e.g., clients 120, in network 100 increases. For example, server 130 may obtain more REQUEST messages from other clients while RDMA CM 134 performs the state transitions required for allocating the QP for connection 140. The other REQUEST messages may be stored in a work queue of the receive operations of QP1. As the size of the work queue is finite, if too many REQUEST messages arrive while a firm REQUEST message is being processed, the work queue may become full and REQUEST messages may be lost.

Figure 3:
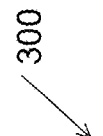
FIG. 3 shows a high-level block diagram of a computer network that implements RDMA protocol with two clients, according to embodiments of the invention.

Reference is made to FIG. 3, which is a high-level schematic diagram of a computer network 300 that implements RDMA protocol with two clients 120 and 220, according to embodiments of the invention. It should be readily understood that the components and functions shown in FIG. 3 are intended to be illustrative only and embodiments of the invention are not limited thereto, and that the number of clients in a typical computer network that implements RDMA protocol is much larger than two and may reach thousands of clients or more.

Server 130 may include RDMA NIC 132, RDMA CM 134 and QP1 136. Client 120 may include RDMA NIC 122, RDMA CM 124 and QP1 126. Client 220 may be similar to client 120 and include RDMA NIC 222, RDMA CM 224 and QP1 226. At network startup, both clients 120 and 220 may wish to establish a connection (similar to connection 140) with host 130, at about the same time, e.g., at a time difference that is smaller than the time it takes server 130 to handle a single request to establish a connection. Thus, both RDMA CM 124 and RDMA CM 224 may send REQUEST messages to RDMA CM 134, at about the same time, e.g., at a time difference that is smaller than the time it takes server 130 to handle a single request to establish a connection. Both REQUEST messages would arrive at QP1 136. RDMA CM 134 may handle one request at a time, and the other request may be stored in QP1 and wait for its turn. While QP1 may include a buffer to store a plurality of incoming messages up to the time when they are handled by RDMA CM 134, the size of this buffer is finite, and at some point, e.g. over certain number of incoming unhandled messages, QP1 136 may become full and incoming messages may be lost, e.g., REQUEST messages may not be stored in QP1 136 and may not be handled.

It may take a finite time (e.g., as determined by the application) for RDMA CM 124 or RDMA CM 224 to determine that the REQUEST message they have sent was lost, since, as noted, QP1 136 may be configured for unreliable datagram class of service. Only after RDMA CM 124 or RDMA CM 224 determines that the REQUEST message was lost (e.g., if an ACCEPT massage does not arrive after a preterminal time from sending the REQUEST message) they will resend the REQUEST message again to initiate the connection. Thus, as the number of nodes or clients 120 and 220 in the network increases, the number of lost request messages may increase and the reliability of RDMA protocol may decrease, leading to packet loss and reduced efficiency. Scaling datacenters is crucial for accommodating the growing demand for computationally intensive tasks, such as, for example, machine learning (ML) or artificial intelligence computation (AI) applications. Overcoming this RDMA bottleneck may help to ensure seamless and reliable communication between nodes and to increase reliability and robustness of computer network 100.

Embodiments of the invention may address the above challenge by providing a more efficient QP establishment procedure in RDMA CM 134 for quicker handling of RESUEST commands, and therefore decreasing the waiting time of RESUEST commands in QP1 and by this decreasing packet loss, and specifically RESUEST commands packet loss. In addition, embodiments of the invention may provide a system and method for scattering GMPs directed to QP1 among a plurality of queues to allow multi-threaded handling of connection requests, and a method for providing reliable communication protocol for the QP1 GMPs, without altering the QP1 protocol. Thus, embodiments of the invention may improve the technology of RDMA communication, by providing a more reliable and robust communication between nodes, especially at startup.

According to embodiments of the invention, RDMA CM 134 of host 130 may generate a plurality of dummy queue pairs, e.g., at startup, each with dummy parameter values. When a QP is created, a complete set of initial attributes, also referred to as parameter values, may be specified, where a subgroup of those initial attributes, e.g., a real address vector, a destination queue pair, a packet sequence number (PSN), and maximum number of outstanding read requests, may be provided to RDMA CM 134 from RDMA CM 124, e.g., in the REQUEST message. Typically, RDMA CM 134 establishes PQ 232 after receiving the REQUEST message from RDMA CM 124, with the required initial attributes. According to embodiments of the invention, however, RDMA CM 134 of host 130 may generate a plurality of dummy queue pairs 231 and 233 before receiving the REQUEST message from RDMA CM 124 (or before receiving any other request message), e.g., at startup, each with dummy parameter values. As noted before, some of the initial attributes or parameter values may be provided to RDMA CM 134 from RDMA CM 124 in the REQUEST message and thus may not be known to RDMA CM 134 at startup. Other initial attributes or parameter values, such as, the completion queue (CQ) to be associated with the send queue, the CQ to be associated with the receive queue and others, may be known to RDMA CM 134 at startup. Thus, RDMA CM 134 may generate the plurality of dummy queue pairs 231 and 233 using dummy parameter values. The dummy parameter values may include the parameters values that are known at startup or before a request to establish a connection is obtained, and preset parameter values instead of those parameter values that are not known at startup or before request to establish a connection is obtained. Thus, RDMA CM 134 may establish a pool of dummy queue pairs 231 and 233 at startup, e.g., by following the sequence of state transitions CreateQP, RST2INIT, and INIT2RTR, for later use.

As known, generating or establishing a QP may require performing a sequence of state transitions of the QP up to a ready to send state of the QP. According to embodiments of the invention, RDMA CM 134 may use the dummy parameter values to perform those state transitions of dummy queue pair 231 up to a ready to send state of dummy queue pair 231.

Upon receiving a request to establish a connection (e.g. in reaction to such a request, or triggered by such a request), e.g., in the form of a REQUEST message from a first computer node, e.g., from client 120 (through RDMA CM 124), RDMA CM 134 may change or turn one of the dummy queue pairs 231 into a functional queue pair 232, by changing the subgroup of the dummy parameter values to true parameter values that are included in the REQUEST message. RDMA CM 134 may change the subgroup of the dummy parameter values to the true parameter values using, for example, a ready to send to ready to send (RTS2RTS) command modified to change the subgroup of the dummy parameter values to the true parameter values. According to some embodiments, the dummy parameter values may be changed to the true parameter values using software, using dedicated hardware, or using a combination thereof.

According to some embodiments, each of the dummy queue pairs 231 and 233 may be associated with one computer node of a plurality of computer nodes in the computer network, e.g., with either client 120 or client 220, and turning one of the dummy queue pairs 231 and 233 into a functional queue pair 232 and 234 may include turning the dummy queue pair 231 and 233 associated with the client that has sent the REQUEST message to the functional queue pair 232 or 234. For example, dummy queue pair 231 may be associated with client 120 and dummy queue pair 233 may be associated with client 220. Upon (e.g., in response to) receiving a REQUEST message from client 120, RDMA CM 134 may turn dummy queue pair 231 to functional QP 232 associated with client 120, and upon receiving a REQUEST message from client 220 and QP 128, RDMA CM 134 may turn dummy queue pair 233 to functional QP 234 associated with client 220 and QP 228.

Figure 4:
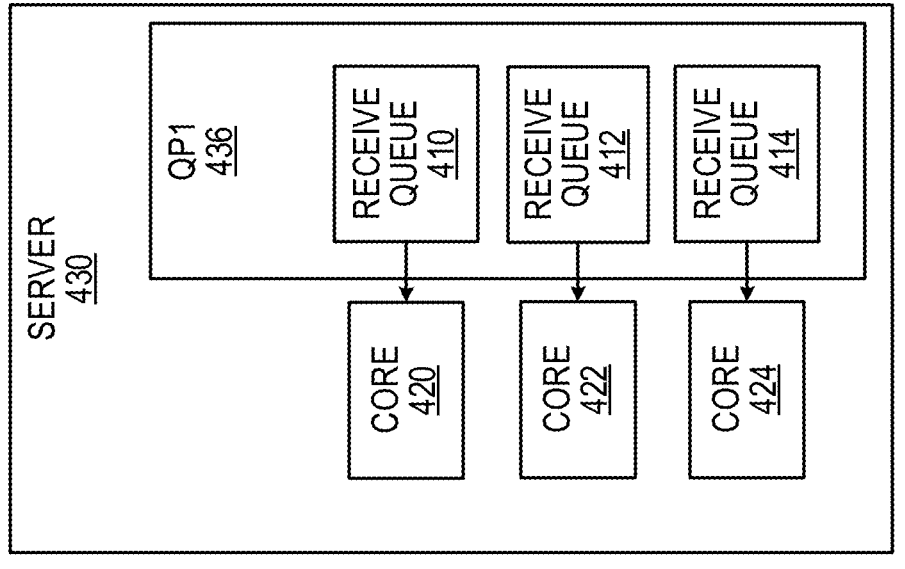
FIG. 4 is a high-level schematic diagram of a multi-queue QP1, according to embodiments of the invention.

Reference is made to FIG. 4, which is a high-level schematic diagram of a multi-queue QP1 436, according to embodiments of the invention. It should be readily understood that the components and functions shown in FIG. 4 are intended to be illustrative only and embodiments of the invention are not limited thereto.

Server 430 may be similar to server 130, except for including a multi-queue QP1 436. Server 430 may include a plurality of cores, 420, 422 and 424, each associated with one receive queue 410 412 and 424. Server 430 (or an RDMA CM of server 430) may receive a plurality of GMPs directed to QP1 436 from a plurality of computer nodes, e.g., clients 120 and 220, of computer network 100, and may scatter the plurality of GMPs to a plurality of receive queues 410, 412 and 424. In some embodiments, server 430 may scatter the plurality of GMPs to the plurality of receive queues 410, 412 and 424 by hashing the source address of the received GMP, selecting a queue for the received GMP from the plurality of receive queues 410, 412 and 424 based on the hash result, e.g., the hash result may be the queue index, and storing the received GMP in the selected queue. According to embodiments of the invention, an interrupt for the respective core 420, 422 and 424 may be generated (e.g., by the RDMA CM) once or in response to storing a received GMP in the receive queue 410, 412 and 424 associated with the respective core 420, 422 and 424. For example, if a GMP is stored in receive queue 410 an interrupt may be generated for core 420.

According to embodiments of the invention, GMPs or QP1 packets may be transmitted using a reliable datagram, instead of the unreliable datagram, to increase the robustness of the RDMA protocol. Furthermore, using a reliable datagram for QP1 may be achieved without substantially altering RDMA CM 134.

Reference is made to FIG. 5, which is a high-level schematic diagram of a computer network 500 that implements RDMA protocol with reliable communication datagram for GMPs, according to embodiment of the invention. It should be readily understood that the components and functions shown in FIG. 5 are intended to be illustrative only and embodiments of the invention are not limited thereto.

Server 530 may be similar to server 130, except for including encapsulation block 532, and client 520 may be similar to client 120, except for including encapsulation block 522. According to embodiments of the invention, transmitting GMPs or QP1 packets using a reliable datagram may be performed using encapsulation. For example, encapsulation blocks 522 and 532, may encapsulate the transmitted GMPs or QP1 packets (the inner packets) in a second type of packets (the encapsulating packet), where the second type of packets conform to a reliable communication protocol, and send the second type of packets over the reliable communication protocol.

In the receiving side, encapsulation blocks 522 and 532 may obtain the second type of packets and decapsulate the received packet to obtain the original GMPs or QP1 packets. Thus, RDMA CM 124, RDMA CM 134, QP1 126 and QP1 136, may remain the same and does not have to undergo any redesign cycles or adjustments in order for computer network 500, client 520 and server 530 to support reliable communication protocol for GMPs or QP1 traffic. In some embodiments, the reliable communication protocol may be the dynamic connected (DC) transport protocol. Other reliable transmission protocols may be used.

For example, if server 530 is the transmitting node, a first packet, e.g., a GMP packet conforming to an unreliable QP1 communication protocol or datagram, may be obtained from an application, e.g., an application that is part of RDMA CM 134, or QP1 136. The first packet may be encapsulated by encapsulation block 532 in a second packet (the encapsulating packet), where the second packet conforms to a reliable communication protocol. The second packet may be sent to client 520. Similarly, if client 520 is the transmitting node, encapsulation block 522 may obtain the GMP packet from an application on client 520, encapsulate the packet in a second packet and send the second packet to server 530.

In one embodiment, encapsulation block 522 or 532 of the transmitting node, e.g., either client 520 or server 530, respectively, may copy the address vector from the inner packet (the original GMPs or QP1 packet) into the encapsulating packet (the second type of packet). The receiving node, e.g., either encapsulation blocks 522 or 532 of client 520 or server 530, respectively, may identify an incoming encapsulating packet (e.g., a DC packet) that is directed to QP1 126 or 136, e.g., if the header includes that dest_qp=1, perform decapsulation of the received packet to obtain the inner packet, e.g., the original GMPs or QP1 packet, and forward the inner packet to QP1 126 or 136.

Reference is now made to FIG. 6, which is a flowchart of a method for establishing connections in a computer network supporting an RDMA protocol, according to embodiments of the invention. While in some embodiments the operations of FIG. 6 are carried out using systems as shown in FIGS. 1, 3, 4 and 10, in other embodiments other systems and equipment can be used.

Figure 10:
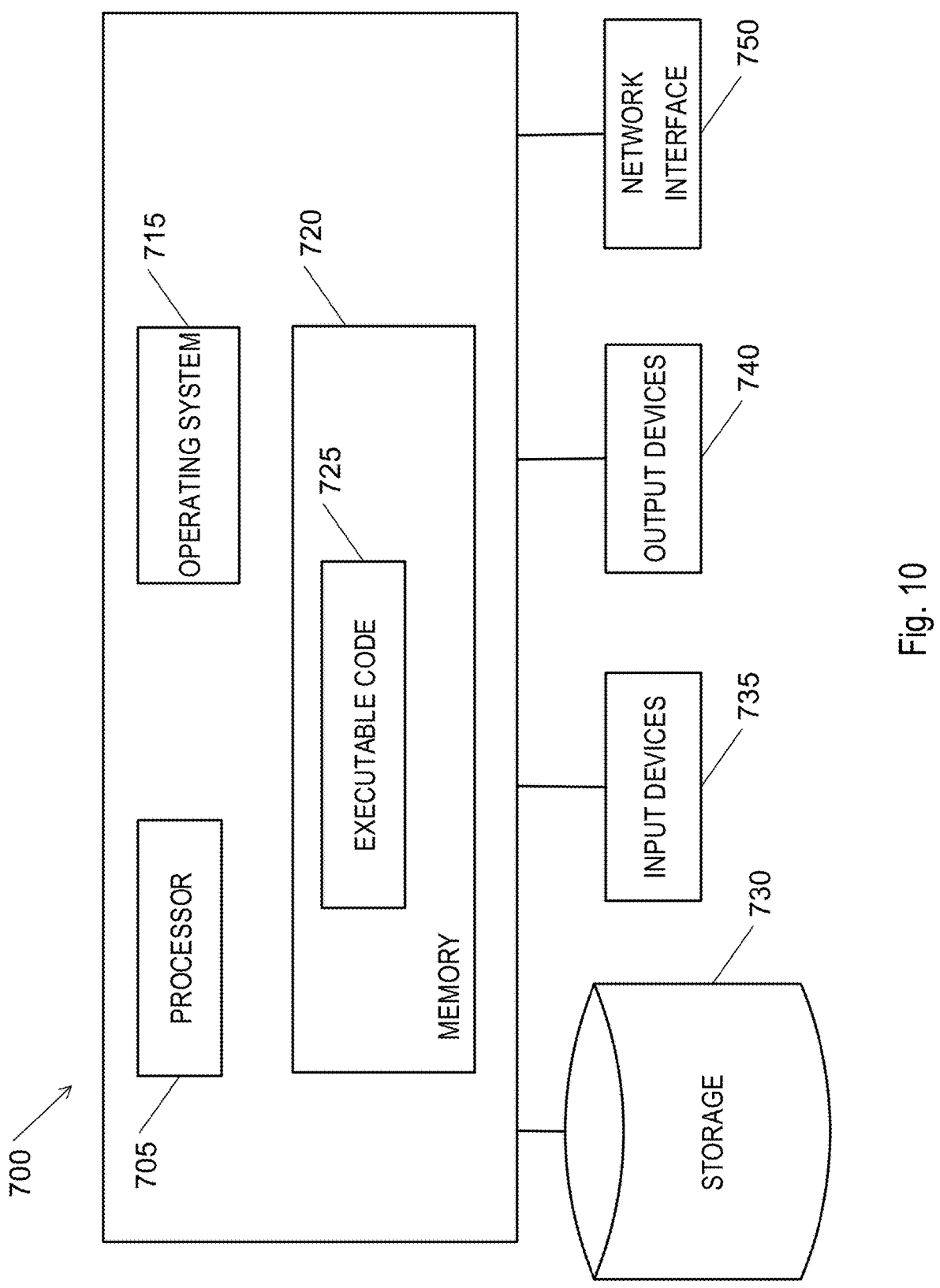
FIG. 10 shows a high-level block diagram of an exemplary computing device which may be used with embodiments of the present invention.

In operation 610, a processor (e.g., processor 705 depicted in FIG. 10, and/or a processor implementing RDMA NIC

132) may generate a plurality of dummy QPs, each generated with dummy parameter values. In some embodiments, the processor may generate plurality of dummy QPs at startup, before obtaining REQUEST messages from other computer nodes in the communication system. The dummy parameter values (also referred to as initial attributes) may include subset of parameter values that are known to the processor when the dummy QPs are generated or established, and a subset of parameter values that are not known to the processor when the dummy QPs are generated or established. For example, the unknown dummy parameter values may include a real address vector, a destination queue pair, a PSN, and maximum number of outstanding read requests. Here, the processor may use preset values for the unknown dummy parameter values, and use the preset values along the known values to perform state transitions of the dummy QP up to a ready to send state of the dummy QP. In some embodiments, each of the dummy QPs may be associated with one computer node of a plurality of computer nodes in the computer network, and turning one of the dummy QPs into a functional QP may include turning the dummy QP associated with the first computer node into the functional QP.

In operation 620, the processor may receive or obtain a request to establish a connection from one of the computer nodes in the computer system, e.g., from client 120. The request may include the true parameter values for the subset of unknown parameter values required for establishing the QP. In response, as indicated in operation 630, the processor may turn one of the dummy QPs into a functional QP by changing the subgroup of the dummy parameter values to true parameter values, e.g., as obtained in the request message. In some embodiments, the processor may change the subgroup of the dummy parameter values to true parameter values using an RTS2RTS command modified to change the subgroup of the dummy parameter values to the true parameter values. In some embodiments, this may be achieved using dedicated hardware.

Reference is now made to FIG. 7, which is a flowchart of a method for scattering GMPs in a computer network supporting an RDMA protocol, according to embodiments of the invention. While in some embodiments the operations of FIG. 7 are carried out using systems as shown in FIGS. 1, 3, 4 and 10 in other embodiments other systems and equipment can be used.

In operation 702, a processor (e.g., processor 705 depicted in FIG. 10, and/or a processor implementing RDMA NIC 132) may receive or obtain a plurality of GMPs directed to QP1 from a plurality of computer nodes of the computer network. For example, the GMPs may include REQUEST, ACCEPT and ESTABLISHED messages. In operation 704, the processor may scatter the plurality of GMPs to a plurality of queues, where the plurality of queues all pertain to QP1. In some embodiments, the processor may scatter the plurality of GMPs to the plurality of queues by hashing the source address of the received GMP, selecting a queue for the received GMP from the plurality of queues based on the hash result, and storing the received GMP in the selected queue. In operation 706, the processor may associate each queue with a respective core of the processor. In operation 708, the processor may generate an interrupt for the respective core once the received GMP is stored in the queue associated with the respective core.

Reference is now made to FIG. 8, which is a flowchart of a method for encapsulating GMPs in a computer network supporting an RDMA protocol, according to embodiments of the invention. While in some embodiments the operations of FIG. 8 are carried out using systems as shown in FIGS. 1, 3, 4 and 10, in other embodiments other systems and equipment can be used.

In operation 810, a processor (e.g., processor 705 depicted in FIG. 10, and/or a processor implementing RDMA NIC 132) may receive, e.g., from an application, a first packet that conforms to an unreliable queue pair 1 (QP1) communication protocol, for example, the first packet may include a GMP. In operation 820, the processor may encapsulate the packet in a second packet that conforms to a reliable communication protocol, e.g., to the DC protocol. In operation 830, the processor may send the second packet over the reliable communication protocol. In operation 840, the processor may receive a packet over the reliable communication protocol from the computer network. In operation 850, the processor may decapsulate the received packet, e.g., so that the decapsulated packet may conform to the QP1 communication protocol. In operation 860, the processor may provide the decapsulated packet to the application (e.g., to QP1 or RDMA CM).

It is noted that embodiments of the methods presented in FIGS. 5-7 may be used independently from one another, or in combination. For example, an RDMA CM may support dummy QP generation, with or without supporting GMPs scattering and/or encapsulation.

Figure 9:
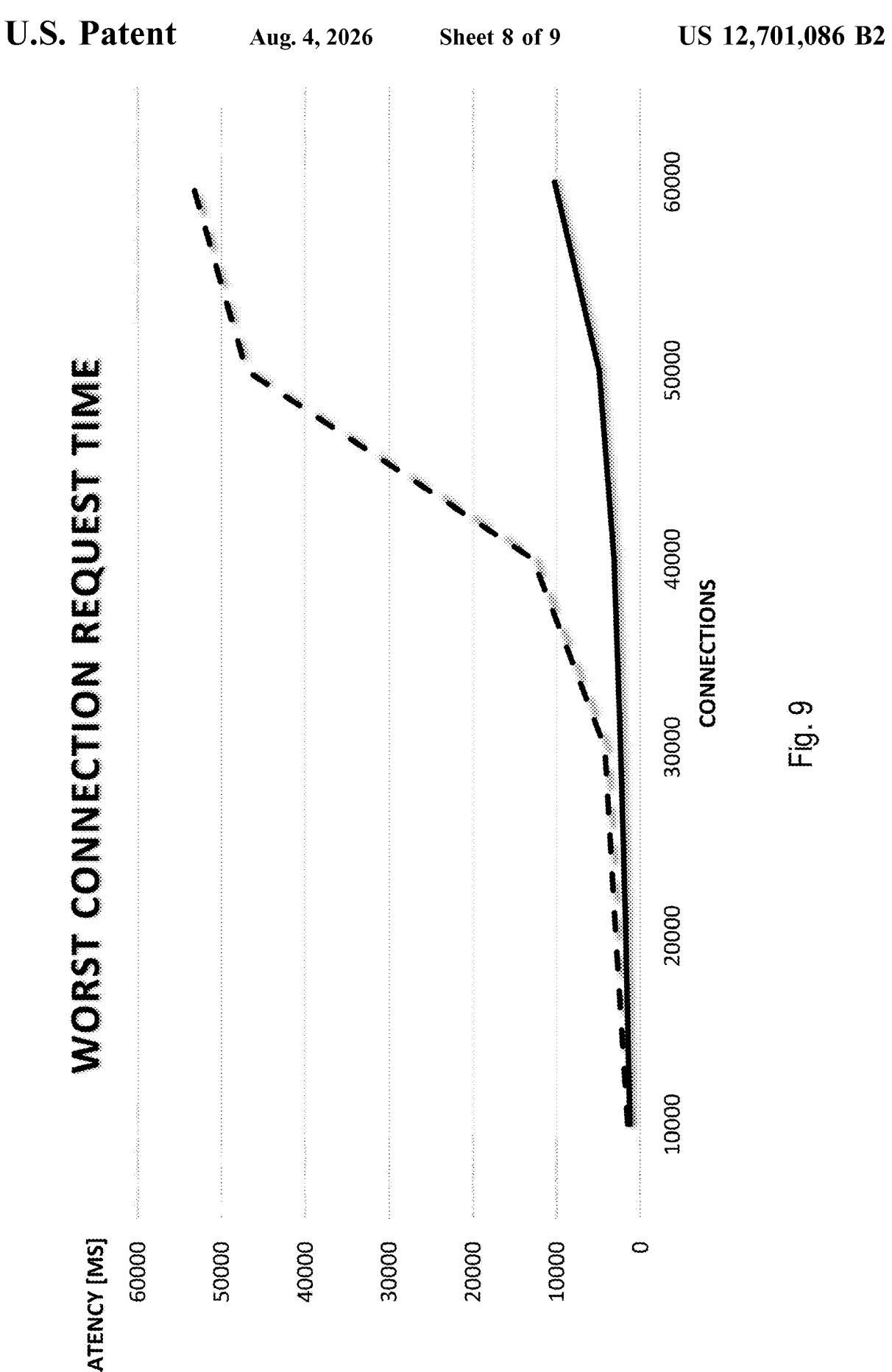
FIG. 9 presents simulation results of a computer network that implements embodiments of the method compared with a legacy computer network.

Reference is now made to FIG. 9, which presents simulation results of a computer network that implements embodiments of the method for establishing connections in a computer network supporting an RDMA protocol combined with embodiments of the method for scattering GMPs in a computer network supporting the RDMA protocol in a solid line, compared with a legacy system in dashed line. The simulation includes a setup of two real nodes, where the first node sends multiple connection requests to the second node. This simulates a network where multiple nodes send connection requests to the same node at the same time. FIG. 9 presents the worst connection request time, e.g., the latency of the latest connection request in a computer network supporting the RDMA protocol. As can be seen, as the number of connections increases, the gap between worst connection request time of the legacy system and the new system increases.

FIG. 10 shows a high-level block diagram of an exemplary computing device which may be used with embodiments of the present invention. Computing device 700 may include a controller or processor 705 that may be or include, for example, one or more central processing unit processor(s) (CPU), one or more Graphics Processing Unit(s) (GPU), a chip or any suitable computing or computational device, an operating system 715, a memory 720, a storage 730, input devices 735 and output devices 740. Each of modules and equipment such as client 120, host 130, NICs 122, 132 and switches IB0 and IB1, as shown in FIG. 1 and other modules or equipment mentioned herein may be or include, or may be executed by, a computing device such as included in FIG. 10 or specific components of FIG. 10, although various units among these entities may be combined into one computing device.

Operating system 715 may be or may include any code segment designed and/or configured to perform tasks involving coordination, scheduling, supervising, controlling or otherwise managing operation of computing device 700, for example, scheduling execution of programs. Memory 720 may be or may include, for example, a Random Access Memory (RAM), a read only memory (ROM), a Dynamic RAM (DRAM), a volatile memory, a non-volatile memory, a cache memory, or other suitable memory units or storage units. Memory 720 may be or may include a plurality of possibly different memory units. Memory 720 may store for example, instructions to carry out a method (e.g. code 725), and/or data such as data related to establishing connections in a computer network supporting an RDMA protocol, etc.

Executable code 725 may be any appropriate executable code, e.g., an application, a program, a process, task, or script. Executable code 725 may be executed by processor 705 possibly under control of operating system 715. For example, executable code 725 may when executed carry out methods according to embodiments of the present invention. For the various modules and functions described herein, one or more computing devices 700 or components of computing device 700 may be used. One or more processor(s) 705 may be configured to carry out embodiments of the present invention by for example executing software or code.

Storage 730 may be or may include, for example, a hard disk drive, a floppy disk drive, a Compact Disk (CD) drive, or other suitable removable and/or fixed storage unit. Data such as instructions, code, telemetry data, etc. may be stored in a storage 730 and may be loaded from storage 730 into a memory 720 where it may be processed by processor 705. Some of the components shown in FIG. 10 may be omitted.

Input devices 735 may be or may include, for example a mouse, a keyboard, a touch screen or pad, or any suitable input device. Any suitable number of input devices may be operatively connected to computing device 700 as shown by block 735. Output devices 740 may include displays, speakers, and/or any other suitable output devices. Any suitable number of output devices may be operatively connected to computing device 700 as shown by block 740. Any applicable input/output (I/O) devices may be connected to computing device 700, for example, a modem, printer or facsimile machine, a universal serial bus (USB) device, or external hard drive may be included in input devices 735 or output devices 740. Network interface 750 may enable device 700 to communicate with one or more other computers or networks. For example, network interface 750 may include a wired or wireless NIC.

Embodiments of the invention may include one or more article(s) (e.g. memory 720 or storage 730) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

One skilled in the art will realize the invention may be embodied in other specific forms using other details without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein. In some cases well-known methods, procedures, and components, modules, units and/or circuits have not been described in detail so as not to obscure embodiments of the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" can include, for example, "multiple" or "two or more". The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A system for establishing connections in a computer network supporting a remote direct memory access (RDMA) protocol, the system comprising:
   a memory; and
   a processor configured to:
      generate a plurality of dummy queue pairs by using dummy parameter values to perform state transitions of the dummy queue pairs up to a ready-to-send state of the dummy queue pair before receiving requests to establish a connection; and
      upon receiving a request to establish a connection from a first computer node in the computer network, turn one of the dummy queue pairs into a functional queue pair by changing a subgroup of the dummy parameter values to true parameter values.

2. The system of claim 1, wherein each of the dummy queue pairs is associated with one computer node of a plurality of computer nodes in the computer network, and wherein the processor is further to turn one of the dummy queue pairs into a functional queue pair by turning the dummy queue pair associated with the first computer node into the functional queue pair.

3. The system of claim 1, wherein the subgroup of the dummy parameters comprises at least one of: a real address vector, a destination queue pair, a packet sequence number (PSN), and maximum number of outstanding read requests.

4. The system of claim 1, wherein the processor is further configured to change the dummy parameter values to the true parameter values using a ready to send to ready to send (RTS2RTS) command modified to change the subgroup of the dummy parameter values to the true parameter values.

5. The system of claim 1, wherein the processor is further configured to obtain the true parameter values are provided from the client in the request.

6. The system of claim 1, wherein the processor is further configured to change the dummy parameter values to the true parameter values using dedicated hardware.

7. The system of claim 1, wherein the processor is further configured to:
   receive a plurality of requests to establish a connection from other computer nodes; and scatter the plurality of requests to establish a connection to a plurality of queues.

8. The system of claim 1, wherein the processor is further configured to send an accept message to the first computer node after turning the dummy queue pair into a functional queue pair.

9. The system of claim 1, wherein receiving the request command and sending the accept message conform to an unreliable communication protocol, wherein the processor is further to encapsulate the messages into packets of a reliable communication protocol.

10. A method for establishing connections in a computer network supporting a remote direct memory access (RDMA) protocol, the method comprising:
   generating a plurality of dummy queue pairs by using dummy parameter values to perform state transitions of the dummy queue pairs up to a ready-to-send state of the dummy queue pair before receiving any request to establish a connection; and
   upon receiving a request to establish a connection from a first computer node in the computer network, turning one of the dummy queue pairs into a functional queue pair by changing a subgroup of the dummy parameter values to true parameter values.

11. The method of claim 10, wherein each of the dummy queue pairs is associated with one computer node of a plurality of computer nodes in the computer network, and wherein turning one of the dummy queue pairs into a functional queue pair comprises turning the dummy queue pair associated with the first computer node into the functional queue pair.

12. The method of claim 10, wherein the subgroup of the dummy parameters comprises at least one of: a real address vector, a destination queue pair, a packet sequence number (PSN), and maximum number of outstanding read requests.

13. The method of claim 10, wherein the dummy parameter values are changed to the true parameter values using a ready to send to ready to send (RTS2RTS) command modified to change the subgroup of the dummy parameter values to the true parameter values.

14. The method of claim 10, wherein the true parameter values are provided from the client to the server in the request.

15. The method of claim 10, wherein the dummy parameter values are changed to the true parameter values using dedicated hardware.

16. The method of claim 10, further comprising:
   receiving a plurality of requests to establish a connection from other computer nodes; and
   scattering the plurality of requests to establish a connection to a plurality of queues.

17. The method of claim 10, further comprising sending an accept message to the first computer node after turning the dummy queue pair into a functional queue pair.

18. The method of claim 17, wherein the request and the accept message conform to an unreliable communication protocol, the method comprising encapsulating the request and the accept message into packets of a reliable communication protocol.

* * * * *